United States Patent [19]

Stratton

[11] 4,064,544
[45] Dec. 20, 1977

[54] RECORDER TRANSDUCER MOUNTING ARRANGEMENT HAVING A TRANSDUCER HOLDING PLATE MOVABLE ALONG A MOUNTING SURFACE OF A TRANSDUCER CARRIAGE

[75] Inventor: Boyd Lehman Stratton, Woodside, Calif.

[73] Assignee: Arvin Industries, Inc., Columbus, Ind.

[21] Appl. No.: 738,309

[22] Filed: Nov. 3, 1976

[51] Int. Cl.² .............................................. G11B 5/00
[52] U.S. Cl. ..................................... 360/99; 360/107
[58] Field of Search ...................... 360/99, 86, 98, 105, 360/106, 107, 133, 135; 346/137; 274/23 A

[56] References Cited

U.S. PATENT DOCUMENTS

| | | | |
|---|---|---|---|
| 3,702,997 | 11/1972 | Jamieson | 360/105 X |
| 3,769,467 | 10/1973 | Gabor | 360/106 |
| 3,770,905 | 11/1973 | Hall, Sr. | 360/105 |
| 3,770,907 | 11/1973 | Sperry | 360/106 |
| 3,814,441 | 6/1974 | Craggs | 360/105 X |

*Primary Examiner*—John H. Wolfe
*Attorney, Agent, or Firm*—Biebel, French & Nauman

[57] ABSTRACT

A disc recorder includes a rotating recording disc and a transducer carriage which is transversely movable with respect to the axis of rotation of the rotating disc. The transducer carriage includes a mounting surface which is substantially perpendicular to the rotating disc and substantially parallel to the direction of movement of the carriage. A transducer holding plate is positioned adjacent and parallel to the mounting surface and a parallel motion linkage attaches the holding plate to the carriage. The linkage confines the motion of the transducer holding plate in a plane parallel to the mounting surface to motion which is substantially perpendicular to the rotating disc. A spring is provided biasing the holding plate against the mounting surface and biasing the holding plate toward the rotating disc. The transducer is positioned on the holding plate such that it coacts with the rotating disc. Friction reducing pads may be positioned between the mounting surface and the transducer holding plate.

7 Claims, 6 Drawing Figures

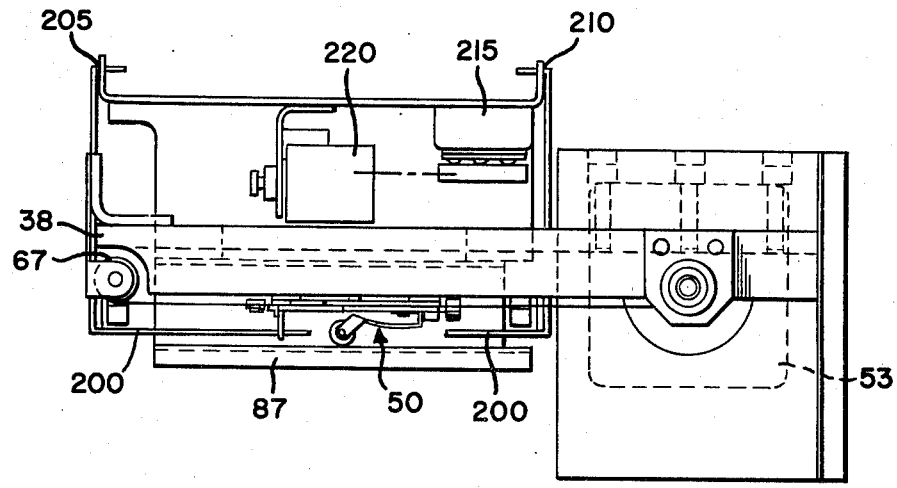
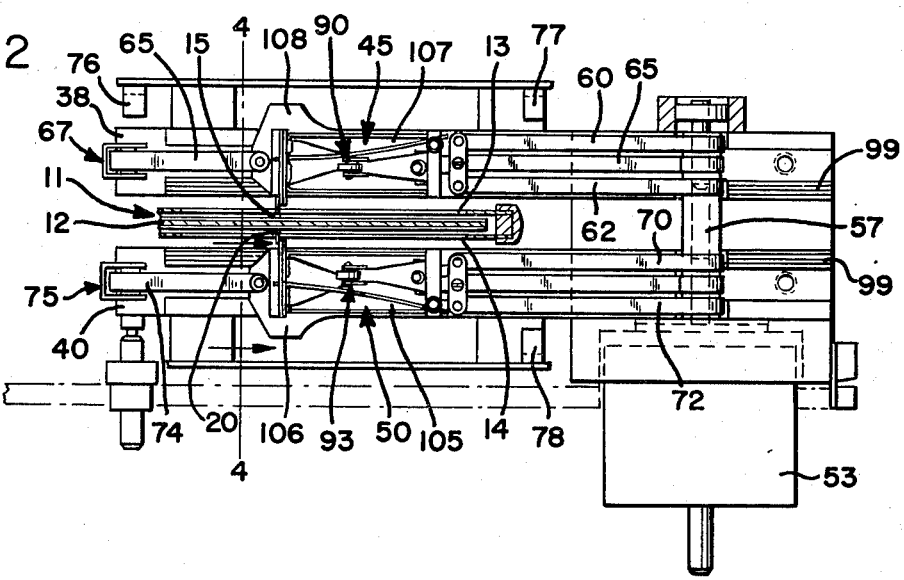
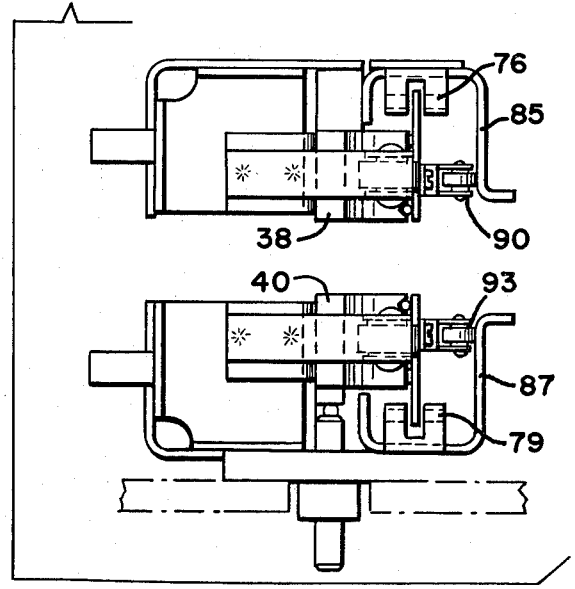
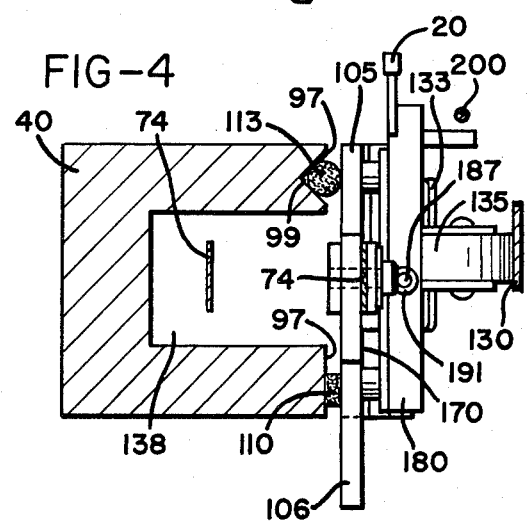

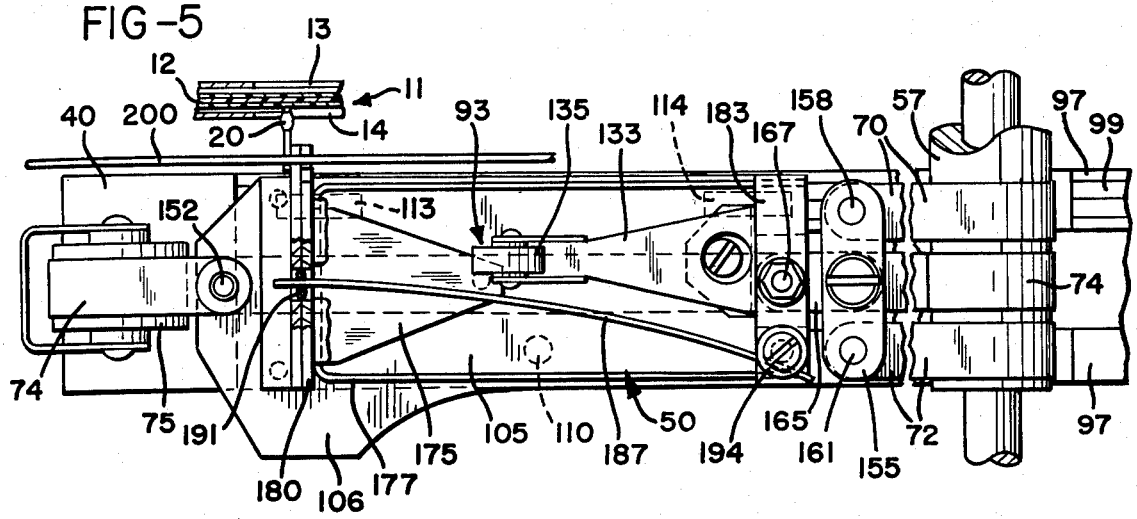
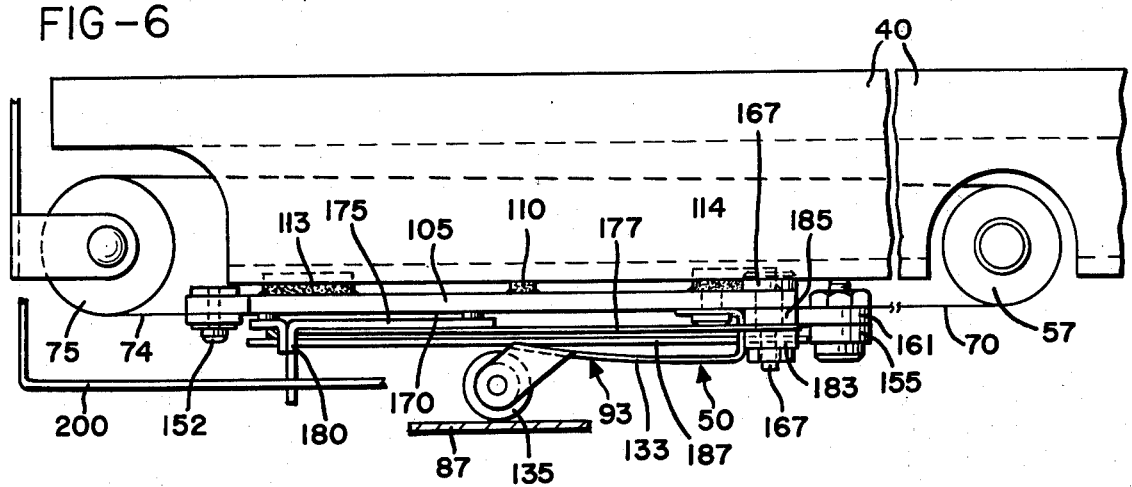

RECORDER TRANSDUCER MOUNTING ARRANGEMENT HAVING A TRANSDUCER HOLDING PLATE MOVABLE ALONG A MOUNTING SURFACE OF A TRANSDUCER CARRIAGE

BACKGROUND OF THE INVENTION

The present invention relates to disc recorders and, more specifically, to recorders in which video information is recorded on a rapidly rotating magnetic disc. The disc used in such a recorder may be constructed of either rigid or flexible material. The recording disc is rapidly rotated and one or more transducer heads are positioned adjacent the recording surface to record and reproduce the video information. In flexible disc recorders, the transducer head, when properly positioned, will actually contact the disc surface. The pressure applied to the disc surface by the transducer head, however, must be relatively slight so that the magnetic coating on the disc is not scraped or otherwise damaged.

Recording of video signals on the disc may be accomplished in a number of ways but the best format for many applications is one in which a number of concentric circular recording tracks are defined on the disc surface. The transducer is moved only intermittently between tracks during recording or playback. Generally one field of video information will be stored in each of the tracks and the magnetic disc will be rotated at a rate equivalent to the field rate of the video signal.

One type of transducer mounting arrangement designed to control transducer head to disc contact is shown in U.S. Pat. No. 3,814,441, issued June 4, 1974 to Craggs. A slotted finger on the side of the flexible disc opposite the transducer urges the disc against the transducer. While this arrangement may be acceptable where a single sided recording disc is being used, the finger would interfere with a second transducer if video recording were to be accomplished on both sides of the disc. Additionally, if the bottom surface of the disc were coated with magnetic material, the finger would cause significant wear of this material.

Another type of transducer mounting arrangement suitable for use with a flexible magnetic disc is U.S. Pat. No. 3,770,907, issued Nov. 6, 1973, to Hall and assigned to the assignee of the present invention. The Hall patent shows a transducer mounted for movement toward and away from a flexible magnetic disc. The transducer is urged into contact with the disc by a counterweighted lever system. The counterweight functions as an inertial mass to provide a constant force which the transducer head exerts against the recording disc. The transducer mounting arrangement shown in the Hall patent is somewhat limited by the face that the counterweight and lever mechanism must be moved as the transducer head is stepped radially to different recording tracks. The overall inertia of the transducer mounting is therefore a limitation on the speed of movement of the transducer.

SUMMARY OF THE INVENTION

A disc recorder includes a rotating recording disc and a transducer carriage which moves transversely with respect to the axis of rotation of the disc. The transducer carriage defines a mounting surface which is substantially perpendicular to the rotating disc and substantially parallel to the direction of movement of the carriage. A transducer holding plate is positioned adjacent and parallel to the mounting surface and a parallel motion linkage attaches the transducer holding plate to the carriage. The parallel motion linkage means confines the motion of the transducer holding plate in a plane parallel to the mounting surface to motion which is substantially perpendicular to the rotating disc. A spring means is provided for biasing the transducer holding plate against the mounting surface and biasing the transducer holding plate toward the rotating disc. In this manner a transducer mounted on the holding plate is properly positioned for recording on the rotating disc.

A plurality of friction reducing pads may be disposed between the mounting surface and the transducer holding plate to facilitate the motion of the holding plate. The spring means may comprise a spring arm acting on a bearing on the holding plate such that no torsional force is applied to the holding plate. Adjustable attachment means is provided for attaching the spring arm to the mounting surface and for adjusting the biasing forces applied to the holding plate.

Accordingly, it is an object of the present invention to provide a disc recorder having a transducer mounting arrangement in which the force of the transducer head on the rotating disc is precisely controlled; to provide such an arrangement in which mass is minimized to facilitate rapid movement of the transducer between recording tracks; and to provide such an arrangement readily useable for transducers on both sides of a flexible magnetic disc.

Other objects and advantages of the present invention will be apparent from the following description, the accompanying drawings and the appended claims.

BRIEF DESCRIPTION OF THE DRAWINGS

FIG. 1 is a plan view of a recorder embodying the present invention with portions of the device removed;

FIG. 2 is a front view of the recorder of FIG. 1;

FIG. 3 is a side view of a portion of the recorder, as seen looking left to right in FIG. 2;

FIG. 4 is an enlarged sectional view taken generally along line 4—4 in FIG. 2;

FIG. 5 is an enlarged front view showing the details of the transducer transport mechanism; and FIG. 6 is a plan view of the portion of the device shown in FIG. 5.

DETAILED DESCRIPTION OF THE INVENTION

Referring now to FIGS. 1, 2 and 3, there is shown a portion of a disc recorder embodying the present invention. FIG. 1 is a plan view with portions of the device removed and broken away. FIG. 2 is a front view of the recorder with the disc cartridge in section. FIG. 3 is a view looking left to right in FIG. 2 with the transducer assemblies and the disc cartridge removed. While disc recorders for recording video signals may use either rigid magnetic discs or flexible discs, those recorders using flexible discs offer greater versatility while reducing the possibility of damage to the disc during operation of the recorder. As seen in FIG. 2, a cartridge 11 may be provided in which the flexible magnetic recording disc 12 is housed. Radially extending slots 13 and 14 in each side of the disc cartridge 11 permit access to the disc by transducers 15 and 20.

The record disc 12 extends between a pair of guide members 38 and 40, one above and one below the disc as shown in FIG. 2. The transducer assemblies 45 and 50 are moved along guide members 38 and 40, respectively, by stepping motor 53. A common drive pulley 57 is used to move both transducer assemblies with the result that they are stepped simultaneously to corresponding positions on opposite sides of the disc. Carriage belt means, including a first carriage belt 60, second carriage belt 62, and third carriage belt 65 move transducer assembly 45 when drive pulley 57 is rotated. Idler pulley 67 at the opposite end of the guide member 38 positions belt 65 as assembly 45 is moved. In like manner, belts 70, 72 and 74 and idler pulley 75 move transducer assembly 50 along guide member 40.

The extent of travel of transducer assemblies 45 and 50 is limited by photo sensors 76, 77, 78 and 79. Sensor 78 is used as a reset to detect when the transducers have been moved to an initial position. The sensors 76, 77 and 79 are provided to protect against overtravel and are not actuated during normal recorder operation.

Running parallel to guide members 38 and 40 are locating members 85 and 87 (FIGS. 1 and 3). Loading means 90 and 93, mounted on transducer assemblies 45 and 50, interact with locating members 85 and 87 to assure the positional stability of the transducer assemblies, as is more fully explained below. The transports for the upper and lower transducers 19 and 20 are identical.

Each of the guide members 38 and 40 is generally U-shaped in cross section, as seen in FIG. 4 and provides a guide surface 97 extending transversely of the disc 35 and including a groove 99 extending parallel to the disc. FIG. 4, an enlarged sectional view of guide member 40, shows transducer carriage means 105 having tab 106 which interacts with the photosensors as explained above. Carriage means 107 likewise includes tab 108 for actuating the appropriate photosensors.

Friction reducing bearing pad 110 is attached to carriage means 105 and slides along guide surface 97. A pair of cylindrical bearing means 113 and 114 are mounted on the carriage member 105 in spaced relation to bearing pad 110 and are positioned to be slidable in groove 99. Loading means 93 includes leaf spring 133 and roller 135 which engage locating surface 130 and bias carriage means 105 toward guide surface 97. Groove 99 and bearing means 113 and 114 prevent relative vertical motion between carriage means 105 and guide member 40 as the transducer assembly is moved along the guide member.

Referring now to FIGS. 5 and 6, the details of the transducer transport mechanism are shown. Guide member 40 extends between drive pulley 57 and idler pulley 75. Carriage means 105 includes friction reducing cylindrical bearing means 113 and 114 and a bearing pad 110. The bearing means and bearing pad allow the carriage means 105 to slide along guide member 40 on guide surface 97. As shown in FIG. 4, groove 99 engages the cylindrical bearing pads on the carriage means as a result of the interaction between loading means 93 and locating surface 130.

The carriage means 105 is moved along guide member 40 such that the transducer head 20 moves radially with respect to flexible recording disc 12. First and second carriage belts 70 and 72 are each attached at one end to carriage means 105 and at the other end to drive pulley 57. Belts 70 and 72 will typically be pinned to drive pulley 57 and will be wrapped around the pulley a number of times. Also pinned to pulley 57 and wrapped around it is third carriage belt 74. Belt 74 is attached to carriage means 105 and extends in the opposite direction from the first and second belts 70 and 72. It should be noted that the third belt 74 is attached to drive pulley 57 intermediate second belts 70 and 72. As seen in FIG. 4, belt 74 extends from idler pulley 75 to drive pulley 57 through cavity 138.

Belt 74 is pivotally attached by bolt 152 to carriage means 105. On the opposite side of the carriage means, a "T"-shaped linkage arrangement is connected to belts 70 and 72. A first linkage means 155 is pivotally attached to belts 70 and 72 at pivot points 158 and 161. A second linkage means 165, attached to the first linkage means 155 intermediate the first and second carriage belts 70 and 72, is pivotally secured to carriage means 105 by bolt 167. The opposing forces applied to the carriage means 105 by the first, second, and third belts are therefore aligned. Second linkage means 165 is secured to carriage means 105 by bolt 167. Since the axes of the drive and idler pulleys are parallel, the friction between the belts and the pulleys is reduced and transducer movement may therefore be effectuated very rapidly. Additionally, since the carriage belts are not twisted, there is not twisting moment applied to the carriage means.

Transducer carriage 105 includes a mounting surface 170 which is substantially perpendicular to rotating disc 12 and substantially parallel to the direction of movement of carriage 105. A transducer holding plate 175 is positioned adjacent and parrallel to mounting surface 170. A plurality of friction reducing pads 176 may be disposed between mounting surface 170 and transducer holding plate 175. These pads may be formed of a graphite material. Parallel motion linkage means 177 includes a generally U-shaped wire which attaches the transducer holding plate 175 to carriage 105. The parallel motion linkage means confines the motion of the transducer holding plate 175 in a plane parallel to the mounting surface 170 to motion which is substantially perpendicular to rotating disc 12. Parallel linkage means 177 is attached to holding plate 175 by potting the wire along the side of flange 180. The ends of the wire are rigidly secured between bar 183 and backing blocks 185. It should be understood that two separate parallel wires could be used as the parallel linkage means with the first ends of the wires attached to the mounting surface 170 and the other ends attached to holding plate 175.

Spring means, including wire spring arm 187, biases the transducer holding plate 175 against mounting surface 170 and also biases plate 175 toward rotating disc 12. Transducer means 20 is rigidly attached to holding plate 175 and thus moves toward disc 12 with a biasing force determined by spring 187. Spring 187 extends through a bearing in the form of a glass bead 191 set in flange 180. The other end of spring arm 187 is adjustably secured by mounting 194 to bar 183. Glass bead 191 prevents twisting forces from being applied to holding plate 175 by spring 187.

The transducer assembly of the present invention is particularly useful where rapid transducer movement is required due to its low inertial mass. Additionally the force exerted on the recording disc by the transducer head may be easily and precisely adjusted.

Bale 200 is provided adjacent the upper edge of flange 180 and extends along the length of travel of transducer 20. A similar bale is provided for transducer assembly 45. As seen in FIG. 1 these bales extend to pivots 205 and 210 and are linked to rotary solenoid 215 and dashpot 220. When solenoid 215 is actuated the bales contact the transducer holding plates and move heads 15 and 20 away from flexible disc 12. The motion of the recording heads is sufficient to allow disc 12 and cartridge 11 to be withdrawn from the recorder.

While the forms of apparatus herein described constitute preferred embodiments of the invention, it is to be understood that the invention is not limited to these precise forms of apparatus, and that changes may be made therein without departing from the scope of the invention.

What is claimed is:

1. A disc recorder comprising:
a rotatable recording disc,
a transducer carriage transversely movable with respect to the axis of rotation of said rotating disc and including a mounting surface which is substantially perpendicular to said disc and substantially parallel to the direction of movement of said carriage,
means for moving said carriage transversely with respect to the axis of rotation of said disc,
a transducer holding plate positioned adjacent and parallel to said mounting surface,
parallel motion linkage means attaching said transducer holding plate to said carriage, for confining the motion of said transducer holding plate in a plane parallel to said mounting surface to motion which is substantially perpendicular to said disc,
spring means biasing said transducer holding plate against said mounting surface and biasing said transducer holding plate toward said disc, and
transducer means positioned on said transducer holding plate for co-acting with said rotating disc.

2. The recorder of claim 1 further comprising a plurality of friction reducing pads disposed between said mounting surface and said plate.

3. The recorder of claim 2 in which said plurality of pads comprises three pads of graphite material.

4. The recorder of claim 1 in which said parallel motion linkage means comprises two parallel wires attached at their first ends to said mounting surface and at their other ends to said transducer holding plate.

5. The recorder of claim 4 in which said wires are pivotally attached to said holding plate.

6. The disc recorder fo claim 1 in which said spring means comprises:
a spring arm,
a bearing on said holding plate for receiving a force from said spring arm, and
adjustable attachment means for attaching said spring arm to said mounting surface and for adjusting the biasing forces applied to said holding plate.

7. The disc recorder of claim 1 in which said rotating recording disc is a flexible magnetic recording disc.

* * * * *